United States Patent Office 2,960,476
Patented Nov. 15, 1960

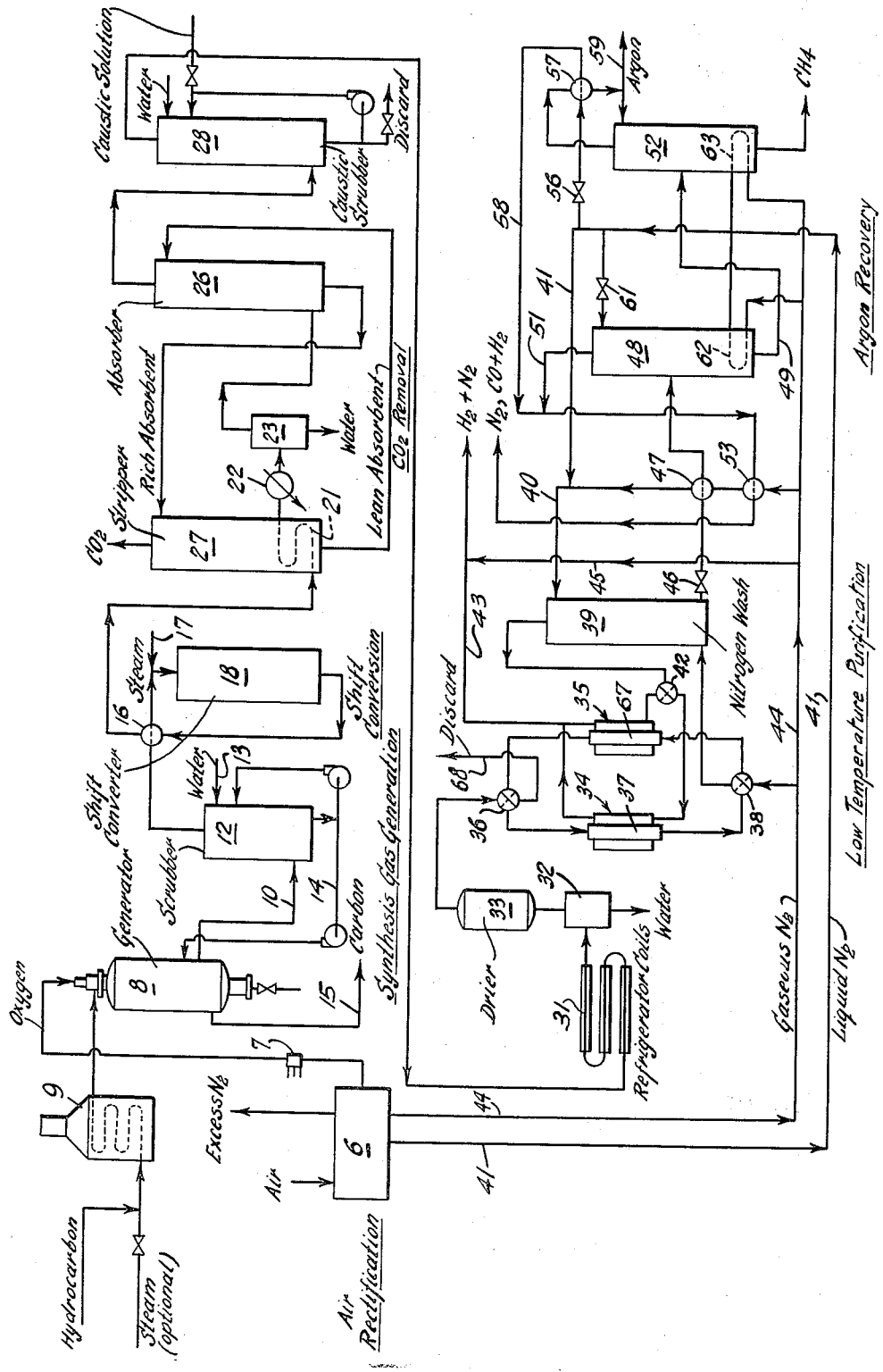

2,960,476
PROCESS FOR THE RECOVERY OF ARGON IN THE PRODUCTION OF SYNTHESIS GAS

Du Bois Eastman, Roger M. Dille, and Ronald W. Chapman, Whittier, Calif., assignors to Texaco Inc., a corporation of Delaware Filed June 27, 1958, Ser. No. 745,039

6 Claims. (Cl. 252—376)

This invention relates to a process for the production of ammonia synthesis feed gas. In one of its more specific aspects, this invention relates to an improved method for the removal of minor amounts of undesirable gases from a hydrogen-rich stream, in particular, argon, as a valuable by-product of the synthesis gas generation process.

This application is a continuation-in-part of our copending application, Serial Number 529,429, filed August 19, 1955, now U.S. Patent No. 2,865,864.

The synthesis of ammonia is effected by reacting nitrogen with hydrogen. Three volumes of hydrogen are required per volume of nitrogen. The ammonia synthesis reaction is conducted at a pressure of several thousand pounds per square inch, generally 5,000 and higher, and an elevated temperature, suitably around 950° F. A catalyst is used; for example, a catalyst prepared from magnetic iron oxide promoted with the oxides of potassium and aluminum and subsequently reduced to metallic iron, is used commercially. In commercial operations, low conversion per pass is obtained, i.e., only a limited amount of the nitrogen-hydrogen mixture is converted to ammonia each time it passes over the catalyst. A conversion of 8 to 12 percent per pass may be expected commercially. Unconverted nitrogen and hydrogen are recycled. It is evident that roughly 90 percent of the feed to the converter represents recycled gas.

Undesirable gases, generally methane (resulting from incomplete reaction of the hydrocarbon in the production of hydrogen), and argon and other inert atmospheric gases tend to accumulate at the converter by building up in concentration in the recycle gas stream. In order to maintain the concentration of the undesirable gases in the converter at a low value, it is customary to purge a portion of the recycle gas stream. This purge represents a loss of hydrogen. In such a system, only about 85 percent of the hydrogen feed is ultimately converted to ammonia; the remainder is lost in purging.

More recently, pure liquid nitrogen has been used as a wash liquid to scrub condensible impurities, including methane and inert atmospheric gases, from the hydrogen-rich gas stream and provide a high purity hydrogen-nitrogen mixture as feed to the ammonia synthesis converter. This method of purification greatly improves the overall yield of ammonia from synthesis feed gas.

Recently the partial oxidation of hydrocarbons with oxygen to carbon monoxide and hydrogen has been developed commercially. A preferred process is disclosed in U.S. Patent 2,582,938 to du Bois Eastman and Leon P. Gaucher. Hydrocarbons, either gaseous or liquid, are especially suited for the production of hydrogen by reaction with oxygen. A feed hydrocarbon, for example, natural gas, or fuel oil mixed with steam, is reacted with an oxygen-containing gas, preferably substantially pure oxygen, in a closed reaction zone at a temperature above about 2,200° F. Oxygen may be obtained by rectification of air. Partial oxidation of the hydrocarbon with oxygen produces a mixture of carbon monoxide and hydrogen. A small amount of methane, e.g. 0.2 to 0.5 mol percent, is usually present in the product gas stream. The carbon monoxide may be reacted with steam to produce carbon dioxide and hydrogen; one volume of hydrogen is produced for each volume of carbon monoxide reacted. Following the addition of nitrogen and the removal of carbon dioxide and other undesired components, ammonia synthesis feed gas is obtained.

Carbon monoxide is usually converted to carbon dioxide by reaction with steam to produce additional hydrogen at about 750° F. in the presence of an iron catalyst. Iron oxide promoted with oxides of chromium, potassium, magnesium and aluminum is a commercial catalyst for this reaction. After purification, in which carbon dioxide and carbon monoxide are removed from the gas stream, the purified mixture of hydrogen and nitrogen required as synthesis feed gas is obtained. Carbon dioxide may be removed by scrubbing the gas with water or an amine, e.g. monoethanolamine, or by a combination of these procedures. Carbon monoxide may be removed by scrubbing the gas with an aqueous solution of cuprous ammonium chloride ($Cu(NH_3)_2Cl$), which also removes carbon dioxide. Various other salts may be used as are known in the art. A caustic wash, i.e. contact between the gas and a solution of sodium hydroxide, is also sometimes used to effect substantially complete removal of carbon dioxide from the synthesis feed gas before it is passed to the ammonia synthesis reactor.

As pointed out above, gases other than hydrogen and nitrogen are most undesirable in the ammonia synthesis reactor. It is desirable therefore, to remove the undesirable gases from the ammonia synthesis feed gas before they enter the ammonia synthesis section of the plant, preferably by a nitrogen wash step as described hereinafter.

In the generation of carbon monoxide and hydrogen by reaction of a hydrocarbon with oxygen, either substantially pure oxygen or oxygen-enriched air obtained by rectification of air, is used to supply the oxygen requirements of the process. In the rectification of air it is possible to take off argon with either the oxygen fraction or the nitrogen fraction, argon having a boiling point between that of oxygen and that of nitrogen.

The effluent from the synthesis gas generator contains a small amount of unconverted hydrocarbon. Regardless of whether gaseous or liquid hydrocarbon feed is supplied to the generator the unconverted hydrocarbon is essentially methane. Unless the methane is removed from the synthesis gas stream, it finds its way into the ammonia synthesis reactor where it acts as an undesirable diluent. It is not practical to remove the methane by reaction with air or oxygen because the relatively low methane content in the raw synthesis feed gas would entail excessive consumption of hydrogen and carbon monoxide in order to eliminate the methane. The methane, as well as other undesirable gases, may be removed from the feed gas by washing the gas stream with liquid nitrogen at low temperature to condense the methane and other higher boiling gases from the hydrogen-rich gas stream following shift conversion and removal of carbon dioxide.

In the production of ammonia synthesis feed gas from coke oven gases, the hydrocarbons and other unwanted gases are sometimes removed by partial liquefaction. The removal of impurities by liquefaction is usually carried out in stages. The hydrogen-rich gas stream is cooled under pressure, e.g., 12 atmospheres, to a temperature sufficiently low to condense the hydrocarbons, e.g., −230° F.; hydrocarbons are separated from the gas stream; and the gas is further cooled to the temperature of liquid nitrogen, e.g., −315 to −320° F., and scrubbed with liquid nitrogen. The liquid nitrogen wash removes the last traces of impurities, including carbon monoxide, from the gas stream. The cold purified gas stream is passed in indirect heat exchange with the incoming hydrogen-rich gas stream. A very pure synthesis gas stream is so produced.

The amount of unconverted methane present in the hydrogen-rich gas stream produced by reaction of a hydrocarbon with oxygen at a temperature above about 2,500° F. is usually within the range of 0.2 to 0.5 mol percent. This small amount of residual methane does not warrant the expense of removal by either secondary reforming (reaction with oxygen) or conventional partial liquefaction. Removal of carbon monoxide is necessary, however, and at the same time it is desirable to remove methane.

As disclosed in our above-mentioned application, Serial Number 529,429, a nitrogen wash operation may be employed to prepare a very pure hydrogen-nitrogen mixture without the necessity for intermediate removal of hydrocarbons provided that certain conditions of operation are observed. As disclosed therein, methane tends to freeze in the forecoolers of the nitrogen wash system causing plugging of the forecoolers. Freezing of methane is prevented by the presence of argon in the gas feed to the liquid nitrogen wash tower. This permits feeding the raw hydrogen stream, following shift conversion and removal of carbon dioxide and water containing residual methane and carbon monoxide, directly to a liquid nitrogen wash system without the intermediate separation of hydrocarbons.

In a preferred method of operation in accordance with this invention, air is rectified to produce an oxygen-rich fraction, containing in excess of 90 mol percent oxygen and preferably on the order of 95 mol percent oxygen and containing all the argon from the air, and a nitrogen fraction of at least 99.5, preferably at least 99.9 mol percent purity. The oxygen fraction is reacted with a carbonaceous fuel at a temperature above about 2,200° F. The product gas is cooled, subjected to the water-gas shift reaction converting carbon monoxide to carbon dioxide, and treated for the removal of carbon dioxide and water thereby producing a hydrogen-rich gas stream containing said argon and small amounts of carbon monoxide and methane. The resulting gas stream is then cooled to a very low temperature and contacted with substantially pure liquid nitrogen. The argon present in the gas stream acts in conjunction with small amounts of residual carbon monoxide to prevent freezing of the methane in the forecooler of the nitrogen wash tower. In the nitrogen wash tower, methane, argon, and carbon monoxide are condensed, and at the same time, some of the nitrogen is vaporized into the hydrogen stream. The unvaporized liquid nitrogen and condensed constituents are withdrawn from the nitrogen wash tower and subjected to fractional distillation for the recovery of argon as a valuable by-product of the process.

The process of our invention will be more readily understood by reference to the following detailed example and the accompanying drawing.

The drawing is a diagrammatic view illustrating a specific example of an application of the process of this invention to the production of ammonia synthesis feed gas from natural gas. Air is rectified in a rectification plant 6 to yield a substantially pure nitrogen fraction and an oxygen-rich fraction, containing in excess of approximately 95 percent oxygen by volume and containing substantially all the argon from the air. Both liquid nitrogen and gaseous nitrogen are available from the rectification plant in substantially pure form for use as indicated later.

A stream of the oxygen fraction from the rectification plant is passed to a compressor 7 and delivered to a synthesis gas generator 8. Natural gas is preheated in preheater 9 and passed to the synthesis gas generator 8. (It is to be understood that a dispersion of liquid hydrocarbon, e.g. heavy fuel oil, in steam may be used instead of natural gas, as disclosed in U.S. Patent 2,809,104 to Strasser et al.) The oxygen and natural gas of this example are separately introduced into the generator and mixed with one another within the generator. The synthesis gas generator is a compact, unpacked reaction zone having a relatively small amount of surface in relation to its volume. A preferred synthesis gas generator is disclosed in U.S. Patent 2,582,938 to du Bois Eastman and Leon P. Gaucher. The synthesis gas generator is autogenously maintained at a temperature above about 2,250° F. by reaction between the oxygen and natural gas.

The raw synthesis gas from the gas generator consists essentially of hydrogen and carbon monoxide and usually contains less than about 0.3 percent residual methane by volume. The raw synthesis gas is discharged from the synthesis gas generator through transfer line 10 to the base of a scrubber 12. Water is introduced into scrubber 12 through line 13. Raschig ring packing preferably is provided to insure intimate contact between the water and the gas. Water is continuously recirculated from the bottom of the scrubber to a point near the top thereof to provide an abundant flow for scrubbing with the minimum requirement of fresh water. This recycling results in some concentration of carbon in the scrubbing water. A portion of the scrubbing water containing carbon suspended therein is passed through line 14 to the synthesis gas generator. The hot gas stream from the reaction zone is contacted directly with the carbon-water mixture from the scrubber whereby the gas is quickly cooled to a temperature not above about 600° F. Quenching by direct water injection vaporizes from about 0.5 to about 1.0 mol water per mol generator effluent. About 0.75 mol water per mol of product gas is vaporized in reducing the temperature of the raw synthesis gas from a generator temperature of 2,600° F. to about 450° F. The resulting thickened dispersion or slurry of carbon in water is drawn off through line 15.

The water-washed gas is discharged from the scrubber through heat exchanger 16 where it is heated to a temperature on the order of 700 to 750° F. The preheated gas is mixed with steam from line 17 and passed into shift converter 18 operated at a temperature of 700 to 750° F. The carbon monoxide, which generally comprises approximately 30 percent by volume of the synthesis gas, is almost completely reacted with steam in the shift converter in the presence of iron catalyst to form equivalent amounts of hydrogen and carbon dioxide. The product gas from the shift converter is at a temperature of about 750° F. and contains approximately 1.5 percent nitrogen by volume and approximately 2 percent residual carbon monoxide by volume on a dry, carbon dioxide-free basis.

The product from the shift converter passes through heat exchanger 16 where it supplies the heat necessary to preheat the gas feed stream to the shift converter. This gas stream is passed through a second heat exchanger 21, the purpose of which will be described hereinafter, and is further cooled in a cooler 22 to about 110° F. Water condensed from the gas stream is separated from the gas in separator 23. The cooled gas then passes into absorber 26 where it is contacted with a suitable absorbing, e.g. monoethanolamine in aqueous solution, for removal of carbon dioxide. Absorbent rich in carbon dioxide is passed to a stripper 27 where the carbon dioxide is driven off by suitable means, in this example heat supplied by heat exchange with the feed gas stream. Absorbent lean in carbon dioxide is returned to the absorber 26.

The gas stream consisting essentially of hydrogen, but still containing small amounts of carbon dioxide, carbon monoxide, methane, and argon, is then passed to a caustic scrubber 28 where the gas is contacted with a ten percent solution of sodium hydroxide. Caustic is continuously recirculated from the bottom to the top of the scrubber.

Provision is made for adding fresh caustic solution to the scrubber and for discarding a part of the used solution to maintain the required concentration of the solution. The gas is contacted with water following the caustic wash to remove entrained caustic solution from the gas stream.

The caustic-scrubbed gas is primarily hydrogen, but contains some nitrogen, part of which is derived from the natural gas, as well as some carbon monoxide, methane and argon. The gas also contains some water vapor. This gas is cooled by refrigeration in ammonia-refrigerated coils 31 to a temperature of about 40° F. Condensed water is separated from the gas stream in separator 32. The partially dried gas then passes through a drier 33 containing alumina to reduce the water vapor to less than two parts per million (i.e. dew point less than −60° F.). Silica gel or other desiccant may be used in place of alumina in the drier.

The dry gas stream is then cooled to approximately −315° F. A pair of heat exchangers 34 and 35 are provided for this purpose. By means of a switching valve 36, the gas stream is directed through one element 37 of heat exchanger 34 where it is cooled to approximately −315° F. In this exchanger, the final traces of carbon dioxide and water are condensed from the gas stream and deposited as solids on the surface of the heat exchanger element 37. The cold gas stream is then directed through a switching valve 38 to the bottom of a nitrogen wash tower 39. Here the gas is contacted with liquid nitrogen introduced to the tower through line 40. The wash tower is provided with bubble cap plates or packing to insure intimate countercurrent contact between the liquid nitrogen and the gas stream. Pure liquid nitrogen flowing downward through the tower condenses argon, carbon monoxide and methane. At the same time, a portion of the liquid nitrogen is vaporized into the gas stream. The gas leaving the top of the tower is essentially free from components other than hydrogen and nitrogen. The resulting gas consists of a mixture of hydrogen and nitrogen which contains only about 0.04 percent argon and less than one part per million of carbon monoxide.

The cold purified gas from the nitrogen wash tower 39 is directed by a switching valve 42 into heat exchanger 34 to cool the incoming gas stream. Following heat exchange, the purified gas stream is discharged through line 43 and mixed with sufficient gaseous nitrogen from the air rectification plant 6, via lines 44 and 45, to produce the desired hydrogen-nitrogen mixture, e.g., an ammonia synthesis feed gas containing three parts hydrogen by volume and one part nitrogen.

The liquid nitrogen reaching the bottom of the nitrogen wash tower 39 contains condensed argon, carbon monoxide, and methane. The wash tower bottoms are continuously withdrawn through valve 46 where the pressure is reduced to about 5 p.s.i.g. and passed through heat exchanger 47 to fractionating tower 48. In heat exchanger 47, part of the feed is vaporized by heat exchange with substantially pure gaseous nitrogen from air rectification step 6, via line 44, condensing the nitrogen.

In fractionating tower 48 a separation is made between methane and argon contained in the wash tower bottoms, and lower boiling components, namely carbon monoxide, nitrogen, and hydrogen. The methane and argon fraction is withdrawn from the bottom of the tower through line 49 while the lower boiling components, hydrogen, nitrogen, and carbon monoxide, pass overhead through line 51. Liquid nitrogen supplies the necessary reflux for the fractionating tower, as more fully described hereinafter.

The methane and argon fraction from the bottom of fractionating column 48 is passed to fractionating column 52. In column 52, substantially pure liquid argon is recovered as a product from the top of the column, while the lower boiling components, comprising mainly methane, is withdrawn from the bottom of the column. The methane fraction, which may contain some argon, may be returned to the synthesis gas generator. The nitrogen and carbon monoxide from the top of fractionating column 48 is passed through heat exchanger 53 where their low temperature is utilized to chill gaseous nitrogen from line 44. Following heat exchange in exchanger 53, the mixture of nitrogen, carbon monoxide, and hydrogen, is discharged from the system through line 54.

Liquid nitrogen, available from the air fractionation plant 6 or from another suitable source, at a pressure of about 300 p.s.i.g., is supplied through line 41 to line 40, as required, to supplement the liquid nitrogen produced by condensation of gaseous nitrogen in heat exchangers 47 and 53. Liquid nitrogen is also utilized to supply reflux to columns 48 and 52. Liquid nitrogen is expanded through reducing valve 56 to heat exchanger 57 where it is vaporized to condense argon as product and as reflux for fractionating column 52. Nitrogen from heat exchanger 57 is passed through line 58 to heat exchanger 53. Liquid argon product is withdrawn through line 59. Liquid nitrogen sufficient to reflux column 48 is admitted from line 41 through valve 61.

Heat for reboiling columns 48 and 52 is obtained from gaseous nitrogen from line 44 supplied to heat exchanger 62 associated with column 48 and heat exchanger 63 associated with column 52. Gaseous nitrogen is condensed to liquid nitrogen in exchangers 62 and 63, supplying heat for reboiling the columns. The resulting liquid nitrogen is combined with the liquid nitrogen from line 41 and is available for refluxing columns 48 and 52, and for the nitrogen wash tower 39.

As previously mentioned, water and carbon dioxide condense from the gas stream in passing through heat exchange element 37 and deposit as solids on the surfaces of the heat exchange element. To prevent the build-up of these deposits to the point where the heat exchanger becomes plugged or has its efficiency seriously impaired, provision is made for periodically discontinuing flow of the hydrogen-rich gas stream through the exchanger and for flushing the heat exchanger element with gaseous nitrogen from the air rectification plant. This is accomplished by admitting gaseous nitrogen from line 44 through switching valve 38 to a heat exchange element.

As illustrated in the drawing, gaseous nitrogen is introduced to element 67 of heat exchanger 35 (which corresponds to element 37 of heat exchanger 34). On passing through heat exchange element 67 (or 37), the warm stream of gaseous nitrogen vaporizes condensed carbon dioxide and water and removes these deposits from the heat exchanger element. This impure nitrogen stream is discarded through line 68. It will be understood that periodically, by changing switching valves 36, 38 and 42 to the positions indicated by the dotted lines, the stream of gas from drier 33 is directed through heat exchange element 67 of exchanger 35 in heat exchange with cold gases from the nitrogen wash tower while at the same time gaseous nitrogen from line 41 is passed through heat exchange element 37 to vaporize the carbon dioxide and water deposits therein and discarded through line 68.

An important feature of this invention is the reboiling of one or both of fractionating columns 48 and 52 with condensing gaseous nitrogen at a pressure of 275 p.s.i.g. or higher, and refluxing of the fractionating columns by means of liquid nitrogen at an appropriate lesser pressure.

In a specific example, natural gas of the following composition is preheated to 915° F. and passed to a synthesis gas generator.

*Natural gas composition*

| Component: | Mol percent |
|---|---|
| Methane | 87.1 |
| Ethane | 7.9 |
| Propane and heavier | 2.0 |
| Nitrogen | 1.9 |
| Carbon dioxide | 1.1 |

Air is rectified at 80 p.s.i.g. to yield an oxygen fraction containing about 94.8 mol percent oxygen, 3.5 percent argon and 1.7 percent nitrogen and a nitrogen fraction containing approximately 99.8 mol percent nitrogen and 0.2 mol percent argon.

The oxygen-rich stream is supplied to the generator at 295° F. where it is mixed with the natural gas in the proportions of 1.455 cubic feet of natural gas per cubic foot of oxygen-containing gas. The gas generator is operated at 340 p.s.i.g. and 2,600° F. The residence time of the gases in the generator, based on the volume of the product gas, is about 3.5 seconds.

The product gas from the generator, prior to quenching, has the following approximate composition:

*Raw synthesis gas*

| Component: | Mol percent |
|---|---|
| Hydrogen | 56.8 |
| Carbon monoxide | 32.0 |
| Water | 7.6 |
| Carbon dioxide | 1.4 |
| Nitrogen | 1.2 |
| Argon | 0.8 |
| Methane | 0.2 |

The raw synthesis gas is quenched with water to 450° F. by direct contact with water followed by scrubbing at 340 p.s.i.g., reheated to 700° F., mixed with steam at 750° F. and passed over an iron shift conversion catalyst. The product gas leaves the shift converter at 750° F. and contains approximately 2 mol percent carbon monoxide on a dry, carbon dioxide-free basis. The gas is cooled to 110° F. to condense water, which is separated from the gas, and scrubbed with methanolamine and caustic solution successively to effect removal of carbon dioxide. The gas stream, at a pressure of 295 p.s.i.g. is cooled to 40° F., condensate is separated from the gas, and the gas stream is passed over alumina. The dry gas, at 275 p.s.i.g., is cooled to −315° F. and scrubbed with liquid nitrogen at about −320° F. The composition of the dry gas to the nitrogen wash system is as follows:

*Feed gas to nitrogen wash*

| Component: | Mol percent |
|---|---|
| Hydrogen | 95.7 |
| Nitrogen | 1.3 |
| Argon | 0.9 |
| Carbon monoxide | 1.9 |
| Methane | 0.2 |

The purified gas stream is heat exchanged with the dry gas in switching heat exchangers. No trouble is experienced with freezing of methane in the heat exchangers or nitrogen wash tower. The bottoms from the nitrogen wash tower has the following composition:

*Nitrogen wash tower bottoms*

| Component: | Mol percent |
|---|---|
| Hydrogen | 2.9 |
| Nitrogen | 51.8 |
| Argon | 13.4 |
| Carbon Monoxide | 29.8 |
| Methane | 2.1 |

The nitrogen wash tower bottoms is sent to the argon recovery fractionation system as described above. Argon of 99+ volume percent purity is recovered as a by-product of the process.

The overhead from the nitrogen wash tower has the following composition:

*Purified gas from nitrogen wash*

| Component: | Mol percent |
|---|---|
| Hydrogen | 91.8 |
| Nitrogen | 8.2 |
| Argon | p.p.m. <10 |
| Carbon monoxide | do. <1 |
| Methane | do. <1 |

Nitrogen-rich gas from the air rectification plant, the composition of which is given above, is mixed with the purified gas from the nitrogen wash tower to yield an ammonia synthesis feed gas of the following composition:

*Ammonia synthesis feed gas*

| Component: | Mol percent |
|---|---|
| Hydrogen | 74.74 |
| Nitrogen | 24.92 |
| Argon | 0.04 |
| Carbon monoxide | p.p.m. <1 |

Methane from the argon recovery unit is combined with the hydrogen, nitrogen, carbon monoxide fraction yielding a fuel gas of the following approximate composition:

*Discard gas from argon recovery unit*

| Component: | Mol percent |
|---|---|
| Hydrogen | 3.1 |
| Nitrogen | 62.7 |
| Carbon monoxide | 31.9 |
| Argon | 0.1 |
| Methane | 2.2 |

Although in the above example and in much of the detailed description of the process, reference is made to the generation of gas from hydrocarbons, it is to be understood that the present process may be applied to the generation of nitrogen and hydrogen from a solid fuel, e.g. coal, as well as from hydrocarbons.

Obviously, many modifications and variations of the invention, as hereinbefore set forth, may be made without departing from the spirit and scope thereof, and therefore only such limitations should be imposed as are indicated in the appended claims.

We claim:

1. In a process for the production of a mixture of hydrogen and nitrogen in predetermined proportions wherein air is subjected to liquefaction and rectification producing an oxygen fraction and a substantially pure nitrogen fraction; carbonaceous fuel is reacted with said oxygen-rich fraction in a gas generation zone under conditions of partial combustion producing carbon monoxide and hydrogen as the principal products of reaction and yielding a product gas comprising carbon monoxide, hydrogen, and methane; said carbon monoxide is converted to carbon dioxide with concomitant production of hydrogen by reaction with steam in a water gas shift reaction zone; carbon dioxide and water are separated from the effluent of said water gas shift reaction zone forming a hydrogen-rich gas stream containing minor amounts of methane and carbon monoxide; said hydrogen-rich gas stream is cooled to a low temperature and contacted with said nitrogen fraction in liquid phase at an elevated pressure in a nitrogen wash step effecting condensation of gases other than hydrogen from said gas stream; the improvement which comprises including substantially all the argon from said air in said oxygen fraction whereby said argon passes through said partial combustion, shift conversion, and purification steps and is condensed in a liquid fraction in said nitrogen wash step in admixture with carbon monoxide and methane; passing said liquid fraction to a separate fractional distillation zone; effecting separation of said liquid fraction from said nitrogen wash step by fractional distillation into a methane-argon liquid fraction and a nitrogen-carbon monoxide gaseous fraction; and passing said methane-argon fraction to a second fractional distillation zone and effecting separation of argon substantially free from methane and heavier constituents therefrom.

2. A process according to claim 1 wherein substantially pure liquid nitrogen from said air liquefaction and rectification step is supplied directly to said first fractional distillation zone as reflux.

3. In a process for the production of a mixture of hydrogen and nitrogen in predetermined proportions wherein air is subjected to liquefaction and rectification producing an oxygen-rich fraction containing argon and a nitrogen fraction substantially free from oxygen and argon; a carbonaceous fuel is reacted with said oxygen-rich fraction in a gas generation zone under conditions of partial combustion producing carbon monoxide and hydrogen as the principal products of reaction and yielding a product gas comprising carbon monoxide, hydrogen, argon, and methane; said carbon monoxide is converted to carbon dioxide with concomitant production of hydrogen by reaction with steam in a water gas shift reaction zone; carbon dioxide and water are separated from the effluent of said water gas shift reaction zone forming a hydrogen-rich gas stream containing minor amounts of methane, carbon monoxide, and argon; said hydrogen-rich gas stream is cooled to a low temperature and contacted with said nitrogen fraction in liquid phase at an elevated pressure in a nitrogen wash step effecting condensation of methane, carbon monoxide and argon from said gas stream and forming a liquid fraction comprising nitrogen, argon, carbon monoxide and methane; the improvement which comprises passing said liquid fraction to a separate fractional distillation zone at near-atmospheric pressure, passing gaseous nitrogen at a pressure effective to produce condensation thereof in indirect heat exchange with liquid in said fractional distillation zone effecting vaporization of said liquid and simultaneous condensation of said nitrogen, supplying substantially pure liquid nitrogen from said air liquefaction and rectification step to said fractional distillation zone as a reflux, effecting separation by fractional distillation between a methane-argon liquid fraction and a nitrogen-carbon monoxide gaseous fraction, and passing said methane-argon fraction to a second fractional distillation zone wherein argon substantially free from other constituents is separated from higher boiling materials comprising methane.

4. A process according to claim 3 wherein gaseous nitrogen under pressure is condensed in indirect heat exchange relationship with methane in liquid form in said second fractional distillation zone to supply heat thereto and liquid nitrogen at reduced pressure is vaporized in indirect heat exchange with gaseous argon effecting condensation thereof.

5. A process according to claim 3 wherein said methane-argon fraction is subjected to fractional distillation in a separate fractional distillation zone at a near-atmospheric pressure not above about 5 p.s.i.g., gaseous nitrogen under elevated pressure is passed in indirect heat exchange with liquid comprising methane in said second fractional distillation zone effecting condensation of nitrogen and simultaneous vaporization of said liquid, and resulting liquid nitrogen is subjected to reduction in pressure and passed at reduced pressure into indirect heat exchange with gas comprising argon in said second fractional distillation zone effecting condensation of said argon and vaporization of said liquid nitrogen.

6. A process according to claim 5 wherein said gaseous nitrogen in indirect heat exchange with said methane-containing liquid is supplied at a pressure in excess of about 250 p.s.i.g.

References Cited in the file of this patent

UNITED STATES PATENTS

| 1,957,744 | Wietzel et al. | May 8, 1934 |
| 2,545,778 | Haringhuizen | Mar. 20, 1951 |
| 2,795,559 | Whaley | June 11, 1957 |
| 2,838,460 | Stratford | June 10, 1958 |
| 2,865,864 | Eastman et al. | Dec. 23, 1958 |

FOREIGN PATENTS

| 952,922 | France | Nov. 28, 1949 |
| 1,139,724 | France | Nov. 19, 1954 |
| 793,336 | Great Britain | Apr. 16, 1958 |